(12) United States Patent
Weber

(10) Patent No.: US 10,018,891 B2
(45) Date of Patent: Jul. 10, 2018

(54) INTEGRATED CAMERA WINDOW

(71) Applicant: Apple Inc., Cupertino, CA (US)

(72) Inventor: Douglas J. Weber, Arcadia, CA (US)

(73) Assignee: APPLE INC., Cupertino, CA (US)

( * ) Notice: Subject to any disclaimer, the term of this patent is extended or adjusted under 35 U.S.C. 154(b) by 500 days.

(21) Appl. No.: 14/192,665

(22) Filed: Feb. 27, 2014

(65) Prior Publication Data

US 2014/0176779 A1 Jun. 26, 2014

Related U.S. Application Data

(62) Division of application No. 13/347,430, filed on Jan. 10, 2012, now Pat. No. 8,684,613.

(51) Int. Cl.

| | |
|---|---|
| *G03B 17/00* | (2006.01) |
| *G03B 17/02* | (2006.01) |
| *G03B 11/04* | (2006.01) |
| *G06F 1/16* | (2006.01) |
| *H04M 1/02* | (2006.01) |
| *G02B 5/00* | (2006.01) |
| *G02B 27/00* | (2006.01) |
| *H04N 5/225* | (2006.01) |

(52) U.S. Cl.
CPC ............ *G03B 11/045* (2013.01); *G02B 5/003* (2013.01); *G02B 27/0018* (2013.01); *G06F 1/1626* (2013.01); *H04M 1/0264* (2013.01); *H04N 5/2256* (2013.01); *Y10T 29/49002* (2015.01)

(58) Field of Classification Search
USPC ............ 396/448, 535; 348/373–376; 65/446
See application file for complete search history.

(56) References Cited

U.S. PATENT DOCUMENTS

| | | |
|---|---|---|
| 3,415,637 A | 12/1968 | Glynn |
| 3,498,773 A | 3/1970 | Due et al. |

(Continued)

FOREIGN PATENT DOCUMENTS

| | | |
|---|---|---|
| AT | 283 630 B | 10/1970 |
| CN | 1277090 A | 12/2000 |

(Continued)

OTHER PUBLICATIONS

Chemically Strengthened Glass, Wikipedia, Apr. 19, 2009, http://en/wikipedia.org/w/index.php?title=Chemically_strengthened_glass&oldid=284794988.

(Continued)

*Primary Examiner* — Minh Phan
(74) *Attorney, Agent, or Firm* — Brownstein Hyatt Farber Schreck, LLP

(57) ABSTRACT

Apparatus, systems and methods for camera integration with cover glass and for processing cover glass to provide a camera window for an electronic device are disclosed. A camera window can be integrated into the cover glass. The apparatus, systems and methods are especially suitable for cover glasses, or displays (e.g., LCD displays), assembled in small form factor electronic devices such as handheld electronic devices (e.g., mobile phones, media players, personal digital assistants, remote controls, etc.). The apparatus, systems and methods can also be used for cover glasses or displays for other relatively larger form factor electronic devices (e.g., portable computers, tablet computers, displays, monitors, televisions, etc.).

22 Claims, 12 Drawing Sheets

(56) References Cited

U.S. PATENT DOCUMENTS

| | | | |
|---|---|---|---|
| 3,558,415 A | 1/1971 | Rieser et al. |
| 3,607,172 A | 9/1971 | Poole et al. |
| 3,626,723 A | 12/1971 | Plumat |
| 3,652,244 A | 3/1972 | Plumat |
| 3,753,840 A | 8/1973 | Plumat |
| 3,798,013 A | 3/1974 | Hasegawa et al. |
| 3,843,472 A | 10/1974 | Toussaint et al. |
| 3,857,689 A | 12/1974 | Koizumi et al. |
| 3,951,707 A | 4/1976 | Kurtz et al. |
| 4,015,045 A | 3/1977 | Rinehart |
| 4,119,760 A | 10/1978 | Rinehart |
| 4,156,755 A | 5/1979 | Rinehart |
| 4,165,228 A | 8/1979 | Ebata et al. |
| 4,148,082 A | 12/1979 | Ganswein et al. |
| 4,212,919 A | 7/1980 | Hoda |
| 4,346,601 A | 8/1982 | France |
| 4,353,649 A | 10/1982 | Kishii |
| 4,425,810 A | 1/1984 | Simon et al. |
| 4,646,722 A | 3/1987 | Silverstein et al. |
| 4,842,629 A | 6/1989 | Clemens et al. |
| 4,844,724 A | 7/1989 | Sakai et al. |
| 4,849,002 A | 7/1989 | Rapp |
| 4,872,896 A | 10/1989 | LaCourse et al. |
| 4,911,743 A | 3/1990 | Bagby |
| 4,937,129 A | 6/1990 | Yamazaki |
| 4,957,364 A | 9/1990 | Chesler |
| 4,959,548 A | 9/1990 | Kupperman et al. |
| 4,983,197 A | 1/1991 | Froning et al. |
| 4,986,130 A | 1/1991 | Engelhaupt et al. |
| 5,041,173 A * | 8/1991 | Shikata et al. ............. 148/321 |
| 5,104,435 A | 4/1992 | Oikawa et al. |
| 5,157,746 A | 10/1992 | Tobita et al. |
| 5,160,523 A | 11/1992 | Honkanen et al. |
| 5,254,149 A | 10/1993 | Hashemi et al. |
| 5,269,888 A | 12/1993 | Morasca |
| 5,281,303 A | 1/1994 | Beguin et al. |
| 5,369,267 A | 11/1994 | Johnson et al. |
| 5,411,563 A | 5/1995 | Yeh |
| 5,437,193 A | 8/1995 | Schleitweiler et al. |
| 5,445,871 A | 8/1995 | Murase et al. |
| 5,525,138 A | 6/1996 | Hashemi et al. |
| 5,625,154 A | 4/1997 | Matsuhiro et al. |
| 5,654,057 A | 8/1997 | Kitayama |
| 5,725,625 A | 3/1998 | Kitayama et al. |
| 5,733,622 A | 3/1998 | Starcke et al. |
| 5,780,371 A | 7/1998 | Rifqi et al. |
| 5,826,601 A | 10/1998 | Muraoka et al. |
| 5,880,411 A | 3/1999 | Gillespie et al. |
| 5,930,047 A | 7/1999 | Gunz et al. |
| 5,953,094 A | 9/1999 | Matsuoka et al. |
| 6,050,870 A | 4/2000 | Suginoya et al. |
| 6,114,039 A | 9/2000 | Rifqui |
| 6,120,908 A | 9/2000 | Papanu et al. |
| 6,325,704 B1 | 12/2001 | Brown et al. |
| 6,393,180 B1 | 5/2002 | Farries et al. |
| 6,429,840 B1 | 8/2002 | Sekiguchi |
| 6,516,634 B1 | 2/2003 | Green et al. |
| 6,521,862 B1 | 2/2003 | Brannon |
| 6,621,542 B1 | 9/2003 | Aruga |
| 6,718,612 B2 | 4/2004 | Bajorek |
| 6,769,274 B2 | 8/2004 | Cho et al. |
| 6,810,688 B1 | 11/2004 | Duisit et al. |
| 6,936,741 B2 | 8/2005 | Munnig et al. |
| 6,996,324 B2 | 2/2006 | Hiraka et al. |
| 7,013,709 B2 | 3/2006 | Hajduk et al. |
| 7,070,837 B2 | 7/2006 | Ross |
| 7,166,531 B1 | 1/2007 | van den Hoek et al. |
| 7,461,564 B2 | 12/2008 | Glaesemann |
| 7,810,355 B2 | 10/2010 | Feinstein et al. |
| 8,110,268 B2 | 2/2012 | Hegemier et al. |
| 8,111,248 B2 | 2/2012 | Lee et al. |
| 8,312,743 B2 | 11/2012 | Pun et al. |
| 8,673,163 B2 | 3/2014 | Zhong |
| 2002/0035853 A1 | 3/2002 | Brown et al. |
| 2002/0157199 A1 | 10/2002 | Piltingsrud |
| 2003/0024274 A1 | 2/2003 | Cho et al. |
| 2004/0051944 A1 | 3/2004 | Stark |
| 2004/0137828 A1 | 7/2004 | Takashashi et al. |
| 2004/0163414 A1 | 8/2004 | Eto et al. |
| 2005/0058423 A1 | 3/2005 | Brinkmann et al. |
| 2005/0105071 A1 | 5/2005 | Ishii |
| 2005/0193772 A1 | 9/2005 | Davidson et al. |
| 2005/0285991 A1 | 12/2005 | Yamazaki |
| 2006/0063351 A1 | 3/2006 | Jain |
| 2006/0070694 A1 | 4/2006 | Rehfeld et al. |
| 2006/0227331 A1 | 10/2006 | Wollmer et al. |
| 2006/0238695 A1 | 10/2006 | Miyamoto |
| 2006/0294420 A1 | 12/2006 | Abramov et al. |
| 2007/0003796 A1 | 1/2007 | Isono et al. |
| 2007/0013822 A1 | 1/2007 | Kawata et al. |
| 2007/0029519 A1 | 2/2007 | Kikuyama et al. |
| 2007/0030436 A1 | 2/2007 | Sasabayashi |
| 2007/0039353 A1 | 2/2007 | Kamiya |
| 2007/0063876 A1 | 3/2007 | Wong |
| 2007/0089827 A1 | 4/2007 | Funatsu |
| 2007/0122542 A1 | 5/2007 | Halsey et al. |
| 2007/0236618 A1 | 10/2007 | Magg et al. |
| 2008/0074028 A1 | 3/2008 | Ozolins et al. |
| 2008/0094716 A1 | 4/2008 | Ushiro et al. |
| 2008/0202167 A1 | 8/2008 | Cavallaro et al. |
| 2008/0243321 A1 | 10/2008 | Walser et al. |
| 2008/0261057 A1 | 10/2008 | Slobodin |
| 2008/0264176 A1 | 10/2008 | Bertrand et al. |
| 2008/0286548 A1 | 11/2008 | Ellison et al. |
| 2009/0046240 A1 | 2/2009 | Bolton |
| 2009/0067141 A1 | 3/2009 | Dabov et al. |
| 2009/0096937 A1 | 4/2009 | Bauer et al. |
| 2009/0153729 A1 | 6/2009 | Hiltunen et al. |
| 2009/0162703 A1 | 6/2009 | Kawai |
| 2009/0197048 A1 | 8/2009 | Amin et al. |
| 2009/0202808 A1 | 8/2009 | Glaesemann et al. |
| 2009/0220761 A1 | 9/2009 | Dejneka et al. |
| 2009/0257189 A1 | 10/2009 | Wang et al. |
| 2009/0324899 A1 | 12/2009 | Feinstein et al. |
| 2009/0324939 A1 | 12/2009 | Feinstein et al. |
| 2010/0009154 A1 | 1/2010 | Allan et al. |
| 2010/0028607 A1 | 2/2010 | Lee et al. |
| 2010/0035038 A1 | 2/2010 | Barefoot et al. |
| 2010/0137031 A1 | 6/2010 | Griffin et al. |
| 2010/0171920 A1 | 7/2010 | Nishiyama |
| 2010/0179044 A1 | 7/2010 | Sellier et al. |
| 2010/0279067 A1 | 11/2010 | Sabia et al. |
| 2010/0285275 A1 | 11/2010 | Baca et al. |
| 2010/0296027 A1 | 11/2010 | Matsuhira et al. |
| 2010/0315570 A1 | 12/2010 | Dinesh et al. |
| 2011/0003619 A1 | 1/2011 | Fujii |
| 2011/0019123 A1 | 1/2011 | Prest et al. |
| 2011/0019354 A1 | 1/2011 | Prest et al. |
| 2011/0063550 A1 | 3/2011 | Gettemy et al. |
| 2011/0067447 A1 | 3/2011 | Zadesky et al. |
| 2011/0072856 A1 | 3/2011 | Davidson et al. |
| 2011/0102346 A1 | 5/2011 | Orsley et al. |
| 2011/0159321 A1 | 6/2011 | Eda et al. |
| 2011/0164372 A1 | 7/2011 | McClure et al. |
| 2011/0199687 A1 | 8/2011 | Sellier et al. |
| 2011/0255000 A1* | 10/2011 | Weber et al. ............. 348/374 |
| 2011/0255250 A1 | 10/2011 | Dinh |
| 2011/0279383 A1 | 11/2011 | Wilson et al. |
| 2011/0300908 A1 | 12/2011 | Grespan et al. |
| 2012/0135195 A1 | 5/2012 | Glaesemann et al. |
| 2012/0136259 A1 | 5/2012 | Milner et al. |
| 2012/0196071 A1 | 8/2012 | Cornejo et al. |
| 2012/0202040 A1 | 8/2012 | Barefoot et al. |
| 2012/0236477 A1 | 9/2012 | Weber et al. |
| 2012/0236526 A1 | 9/2012 | Weber et al. |
| 2012/0281381 A1 | 11/2012 | Sanford |
| 2013/0071601 A1 | 3/2013 | Bibl et al. |

FOREIGN PATENT DOCUMENTS

| | | |
|---|---|---|
| CN | 101523275 | 2/2009 |
| CN | 101465892 | 6/2009 |
| CN | 1322339 A | 11/2011 |
| DE | 17 71 268 A1 | 12/1971 |

(56) References Cited

FOREIGN PATENT DOCUMENTS

| | | |
|---|---|---|
| DE | 32 12 612 A1 | 10/1983 |
| DE | 103 22 350 A1 | 12/2004 |
| EP | 2025556 A2 | 2/2009 |
| EP | 2036867 A1 | 3/2009 |
| EP | 2075237 | 7/2009 |
| GB | 1 346 747 | 2/1974 |
| JP | B S42-011599 | 9/1963 |
| JP | 55031944 | 3/1980 |
| JP | 55 067529 | 5/1980 |
| JP | 55-95645 | 7/1980 |
| JP | 55 144450 | 11/1980 |
| JP | 59037451 | 2/1984 |
| JP | A S61-097147 | 5/1986 |
| JP | 6066696 | 10/1986 |
| JP | 63 060129 | 3/1988 |
| JP | 63222234 | 9/1988 |
| JP | 6242260 A | 9/1994 |
| JP | A H09-507206 | 7/1997 |
| JP | A 2001-083887 | 3/2001 |
| JP | A 2002-160932 | 6/2002 |
| JP | A2003-146705 | 5/2003 |
| JP | A 2004-094256 | 3/2004 |
| JP | A2004-259402 | 9/2004 |
| JP | A 2005-156766 | 6/2005 |
| JP | 2007-099557 | 4/2007 |
| JP | 2008007360 | 1/2008 |
| JP | A 2008-195602 | 8/2008 |
| JP | A 2008-216938 | 9/2008 |
| JP | A 2008-306149 | 12/2008 |
| JP | A 2009-234856 | 10/2009 |
| JP | 2010 064943 | 3/2010 |
| JP | A 2010-060908 | 3/2010 |
| JP | 2010/195600 | 9/2010 |
| JP | A 2010-237493 | 10/2010 |
| JP | A 2011-158799 | 8/2011 |
| KR | 2010-2006-005920 | 1/2006 |
| TW | 201007521 A | 2/2010 |
| TW | 201235744 A1 | 9/2012 |
| WO | WO 00/47529 A | 8/2000 |
| WO | WO 02/42838 A1 | 5/2002 |
| WO | WO 2004-061806 | 7/2004 |
| WO | WO 2004/106253 A | 12/2004 |
| WO | WO 2008/044694 A | 4/2008 |
| WO | WO 2008/143999 A1 | 11/2008 |
| WO | WO 2009/078406 | 6/2009 |
| WO | WO 2009/102326 | 8/2009 |
| WO | WO 2010/005578 | 1/2010 |
| WO | WO 2010/014163 | 2/2010 |
| WO | WO 2010/019829 A1 | 2/2010 |
| WO | WO 2010/101961 | 9/2010 |
| WO | WO 2012/015960 | 2/2012 |
| WO | WO 2012/106280 | 8/2012 |

OTHER PUBLICATIONS

Wikipedia: "Iphone 4", www.wikipedia.org, retrived Oct. 31, 2011, 15 pgs.
"Toward Making Smart Phone Touch-Screens More Glare and Smudge Resistant", e! Science News, http://eciencenews.com/articles/2009/08/19toward.making.smart.phone.touch.screens.more.glare.and.smudge.resistant, Aug. 19, 2009, 1 pg.
Arun K. Varshneya, Chemical Strengthening of Glass: Lessons Learned and Yet to be Learned International Journal of Applied Glass Science, 2010, 1, 2, pp. 131-142.
Aben "Laboratory of Photoelasticity", Institute of Cybernetics at TTU, www.ioc.ee/res/photo.html, Oct. 5, 2000.
Forooghian et al., Investigative Ophthalmology & Visual Science; Oct. 2008, vol. 49, No. 10.
"iPhone 4", Wikipedia, Jan. 4, 2012, 17 pgs.
Mehrl et al., "Designer's Noticebook: Proximity Detection IR LED and Optical Crosstalk", http://ams.com/eng/content/view/download/145137, Aug. 1, 2011, 5 pages.
Invitation to Pay Additional Fees and Where Applicable, Protest Fee for International Application No. PCT/IUS2013/020217, dated Apr. 9, 2013.
Written Opinion for International Application No. PCT/IUS2013/020217, dated Aug. 8, 2013.
International Search Report for International Application No. PCT/IUS2013/020217, dated Aug. 8, 2013.
Restriction Requirement for U.S. Appl. No. 13/347,430, dated Jan. 10, 2012.
Office Action for U.S. Appl. No. 13/347,430, dated May 9, 2013.
Notice of Allowance for U.S. Appl. No. 13/347,430, dated Nov. 12, 2013.
Office Action for Australian Patent Application No. 2013208264, dated Aug. 8, 2014.

* cited by examiner

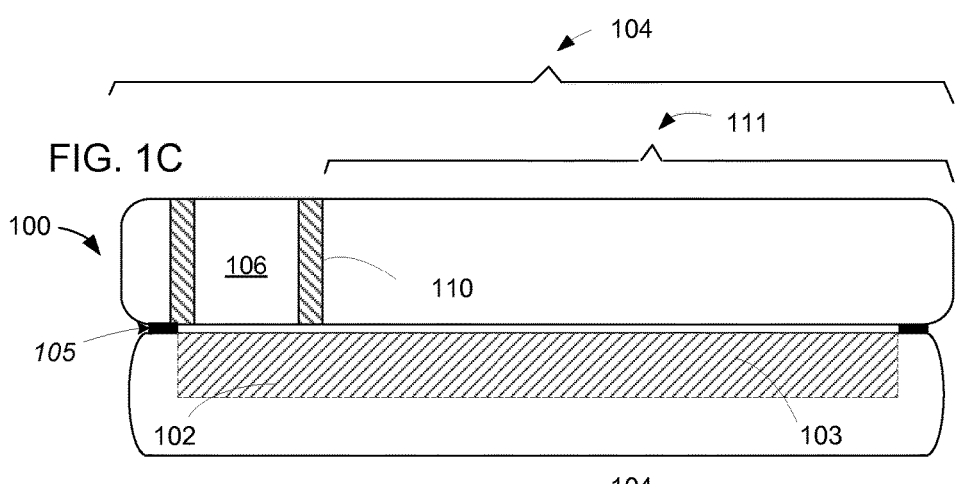
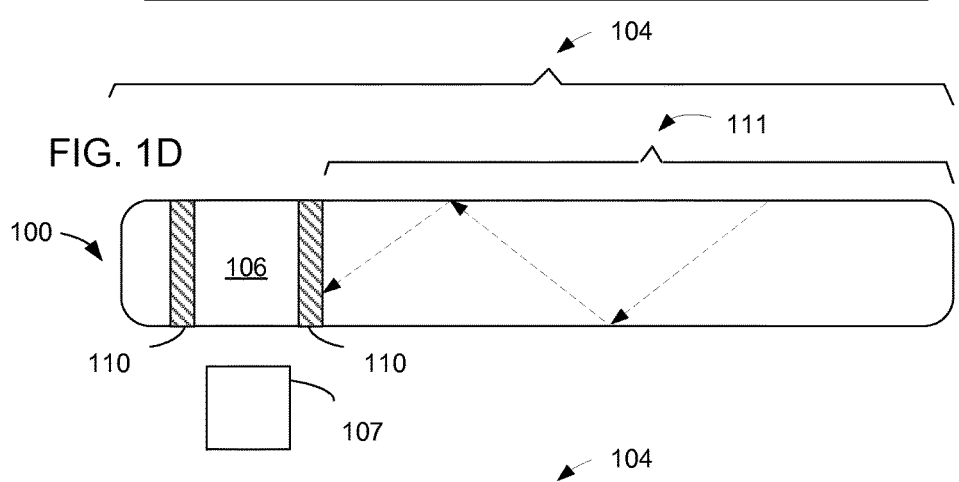
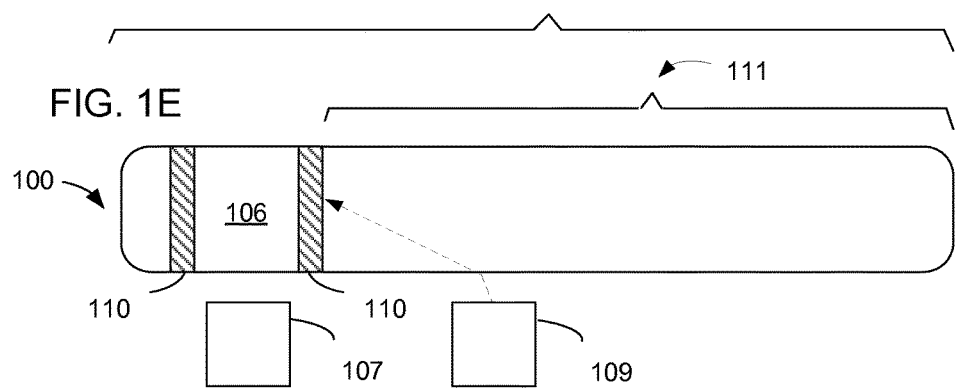

INTEGRATED CAMERA WINDOW

CROSS REFERENCE TO RELATED APPLICATION

This application is a divisional of U.S. application Ser. No. 13/347,430, filed Jan. 10, 2012, from which priority is claimed, and the content of which is hereby incorporated by reference.

BACKGROUND OF THE INVENTION

The present invention relates generally to processing glass. More particularly, the present invention relates to processing cover glass used in portable electronic devices.

Conventionally, small form factor devices, such as handheld electronic devices, have a display arrangement that includes various layers. The various layers include at least a display technology layer, and may additionally include a sensing arrangement and/or a cover window disposed over the display technology layer. By way of example, the display technology layer may include or pertain to a Liquid Crystal Display (LCD) that includes a Liquid Crystal Module (LCM). The LCM generally includes an upper glass sheet and a lower glass sheet that sandwich a liquid crystal layer therebetween. The sensing arrangement may be a touch sensing arrangement such as those used to create a touch screen. For example, a capacitive sensing touch screen can include substantially transparent sensing points or nodes dispersed about a sheet of glass (or plastic). In addition, the cover window, which is typically designed as the outer protective barrier, may be glass or plastic. However, glass tends to provide a better protective barrier given its strength and scratch resistance.

Further, rapid improvements in size and cost of digital camera technology have lead to integration of one or more digital cameras into various portable electronic devices. While such integration provides convenience in having camera functionality available, often quality of images or video captured by such integrated cameras suffers. Moreover, although images or video of dark scenes could benefit from a flash or other illumination, for various reasons including integration difficulties, flash or other illumination are often omitted from portable electronic devices.

Thus, in electronic devices there is a continuing need for improved approaches for camera integration with glass cover arrangements.

SUMMARY

Apparatus, systems and methods for camera integration with cover glass and for processing cover glass to provide a camera window for an electronic device are disclosed. A camera window can be integrated into the cover glass. The apparatus, systems and methods are especially suitable for cover glasses, or displays (e.g., LCD displays), assembled in small form factor electronic devices such as handheld electronic devices (e.g., mobile phones, media players, personal digital assistants, remote controls, etc.). The apparatus, systems and methods can also be used for cover glasses or displays for other relatively larger form factor electronic devices (e.g., portable computers, tablet computers, displays, monitors, televisions, etc.).

The invention can be implemented in numerous ways, including as a method, system, device or apparatus. Several embodiments of the invention are discussed below.

As a consumer electronic product, one embodiment can include at least a housing and electrical components disposed at least partially internal to the housing, wherein the electrical components including at least a camera. A cover glass can be coupled to the housing. The cover glass can have a substantially smooth exterior surface comprising a transparent region substantially encircled by an optical barrier perimeter. The camera can being arranged adjacent to the transparent region and within the optical barrier perimeter so that the transparent region of the cover glass is substantially transparent to the camera. The optical barrier perimeter can be interposed within the cover glass between the camera and an adjacent region of the cover glass for reducing glare at the camera via the cover glass.

As a consumer electronic product, another embodiment can include at least a housing and electrical components disposed at least partially internal to the housing, wherein the electrical components include at least a camera. A cover glass can be coupled to the housing. The cover glass can comprise a chemically strengthened glass camera window and an optical barrier. The camera can be arranged adjacent to the chemically strengthened glass camera window. The optical barrier can be interposed within the cover glass between the camera and an adjacent region of the cover glass for reducing glare at the camera via the cover glass.

As consumer electronic product, another embodiment can include at least a housing and electrical components disposed at least partially internal to the housing, wherein the electrical components include at least a camera. A cover glass can be coupled to the housing. The cover glass can comprise a transparent camera window and an adjacent glass region that is dark or opaque. The camera can be arranged adjacent to the transparent camera window. The adjacent glass region can be sufficiently dark or opaque for substantially reducing glare at the camera via the cover glass.

As consumer electronic product, still another embodiment can include at least a housing and electrical components disposed at least partially internal to the housing, wherein the electrical components include at least a camera. A cover glass can be coupled to the housing. The cover glass can comprise a camera window and an optical barrier. The camera can be arranged adjacent to the camera window. The optical barrier can comprise an optical barrier perimeter substantially encircling the camera window, and the optical barrier perimeter can comprise a layer of material applied by physical vapor deposition.

As a method for assembling an electronic product, one embodiment includes at least the acts of: forming an aperture in a cover glass, disposing a transparent camera window in the cover glass, and lapping the transparent camera window and an adjacent glass region of the cover glass into a planar exterior surface of the cover glass. Additionally, if desired, the method can further include the acts of disposing the transparent camera window adjacent to a camera, and subsequently attaching the cover glass to a housing for the electronic product.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 1A-1E show views of one or more embodiments of a consumer electronic product.

Figure 1A:
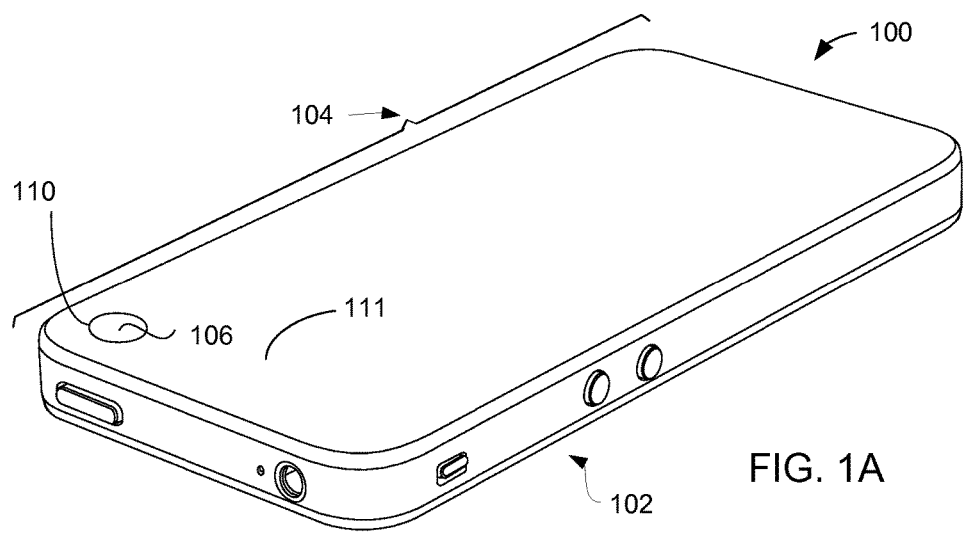

It should be noted that FIGS. 1-11 are not necessarily drawn to scale. Instead, these figures are enlarged so that features are more readily visible.

DETAILED DESCRIPTION OF EMBODIMENTS OF THE INVENTION

Apparatus, systems and methods for camera integration with cover glass and for processing cover glass to provide a camera window for an electronic device are disclosed. A camera window can be integrated into the cover glass. The apparatus, systems and methods are especially suitable for cover glasses, or displays (e.g., LCD displays), assembled in small form factor electronic devices such as handheld electronic devices (e.g., mobile phones, media players, personal digital assistants, remote controls, etc.). The apparatus, systems and methods can also be used for cover glasses or displays for other relatively larger form factor electronic devices (e.g., portable computers, tablet computers, displays, monitors, televisions, etc.).

Since handheld electronic devices and portable electronic devices are mobile, they are potentially subjected to various different impact events and stresses that stationary devices are not subjected to. As such, the invention is well suited for implementation of displays for handheld electronic device or a portable electronic device that are designed to be thin.

In one embodiment, the size of the glass cover depends on the size of the associated electronic device. For example, with handheld electronic devices, the glass cover is often not more than five (5) inches diagonal. As another example, for portable electronic devices, such as smaller portable computers or tablet computers, the glass cover is often between four (4) to twelve (12) inches diagonal. As still another example, for portable electronic devices, such as full size portable computers, displays or monitors, the glass cover is often between ten (10) to twenty (20) inches diagonal or even larger.

However, it should be appreciated that with larger screen sizes, the thickness of the glass layers may need to be greater. The thickness of the glass layers may need to be increased to maintain planarity of the larger glass layers. While the displays can still remain relatively thin, the minimum thickness can increase with increasing screen size. For example, the minimum thickness of the glass cover can correspond to about 0.4 mm for small handheld electronic devices, about 0.6 mm for smaller portable computers or tablet computers, about 1.0 mm or more for full size portable computers, displays or monitors, again depending on the size of the screen. The thickness of the glass cover depends on the application and/or the size of electronic device. While the current trend is to accommodate thinner and thinner devices, some examples for thicknesses of the glass cover can correspond to about 1 mm for small handheld electronic devices, about 2 mm for smaller portable computers or tablet computers, about 3 mm or more for full size portable computers, displays or monitors, again depending on the size of the screen.

Embodiments of the invention are discussed below with reference to FIGS. 1A-11. However, those skilled in the art will readily appreciate that the detailed description given herein with respect to these figures is for explanatory purposes as the invention extends beyond these limited embodiments.

FIGS. 1A-1E show views of one or more embodiments of a consumer electronic product. The electronic device 100 may, for example, be embodied as portable or handheld electronic device having a thin form factor (or low profile). The electronic device 100 can, for example, correspond to a media player, a media storage device, a Portable Digital Assistant (PDA), a tablet PCs, a computer, a cellular phone, a smart phone, a GPS unit, a remote control, and the like.

Figure 1B:
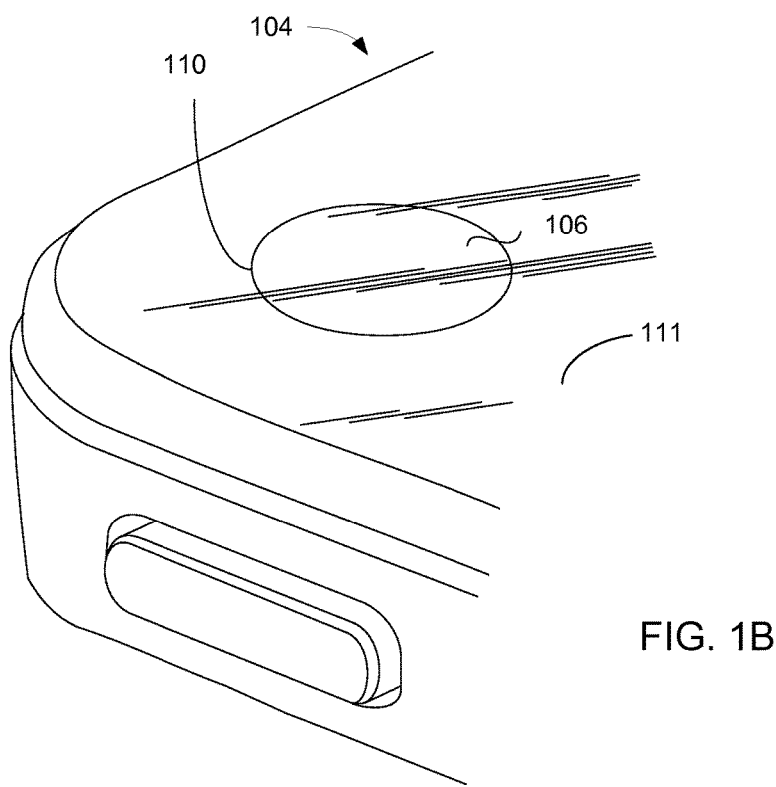

FIG. 1A shows a perspective view of electronic device 100 according to one embodiment. FIG. 1B shows a detailed view of the electronic device 100. The electronic device 100 may include a housing 102 that serves as part of an outer surface for the electronic device 100. Electrical components (not shown in FIGS. 1A and 1B) may be disposed within the housing 102. The electrical components may include, but are not limited to, a controller (or processor), memory, battery, display, camera, and illuminator such as a flash.

Additionally, glass may be used in covering front and/or back surfaces of the electronic device 100. The electronic device 100 may have at least one cover glass 104. The cover glass 104 may serve as an external surface, i.e., front or back surface, for the electronic device 100. The cover glass 104 may also resist scratching and therefore may provide a substantially scratch-resistance surface for the front or back surface of the housing 102 for the electronic device 100. The cover glass 104 may be coupled to the housing 102, for example, using an adhesive.

The cover glass 104 may be provided over a camera area. The cover glass 104 may comprise a transparent camera window 106 at or adjacent the camera area. In one example, the camera area may comprise at least a camera such as a digital camera for capturing images or video. At or adjacent the camera area, the transparent camera window 106 of the cover glass 104 may be substantially transparent to the camera, for capturing images or video through the cover glass 104. The camera area may extend within the housing 102 of the electronic device 100. A minority region of cover glass 104 adjacent to the camera may extend over the camera area. The minority region of cover glass 104 adjacent to the camera may comprise the transparent camera window 106. The cover glass 104, and more particularly the transparent camera window 106 can substantially overlap the camera, In one embodiment, a peripheral region of the cover glass 104 (more particularly the transparent camera window 106) may be adjacent to the camera and may extend over the camera area.

Similarly, the cover glass 104 may be provided over an illuminator area. In one example, the illuminator area may comprise at least an illuminator such as a light emitting diode (LED) or electronic flash tube for illuminating dark scenes. At the illuminator area, the cover glass 106 may be substantially transparent to the illuminator and arranged so that illumination may project outwardly from the cover glass 104. The illuminator area may be disposed within the housing 102 of the electronic device 100.

Additionally, in some embodiments the cover glass 104 may be provided over a display area. In some embodiments the cover glass 104 may be substantially transparent so that the display area can be viewed through the cover glass 104. In some embodiments, the display area may be disposed within the housing 102 of the electronic device 100. In some embodiments, the electronic device 100 may include a full view or substantially full view display area that consumes a majority of the front surface of the electronic device 100. The display area may be embodied in a variety of ways. In one example, the display area may comprise at least a display such as a flat panel display and more particularly an LCD display.

The display area may alternatively or additionally include a touch sensing device positioned over a display screen. For example, the display area may include one or more glass layers having capacitive sensing points distributed thereon. Each of these components may be separate layers or they may be integrated into one or more stacks. In one embodiment, the cover glass 104 may act as the outer most layer of the display area.

In some embodiments, the electronic device 100 may include a display region (e.g., the display area) that includes various layers. The various layers may include at least a display, and may additionally include a sensing arrangement disposed over the display. In some cases, the layers may be stacked and adjacent one another, and may even be laminated thereby forming a single unit. In other cases, at least some of the layers are spatially separated and not directly adjacent.

For example, the sensing arrangement may be disposed above the display such that there is a gap therebetween. By way of example, the display may include a Liquid Crystal Display (LCD) that includes a Liquid Crystal Module (LCM). The LCM generally includes at least an upper glass sheet and a lower glass sheet that at least partially sandwich a liquid crystal layer therebetween. The sensing arrangement may be a touch sensing arrangement such as those used to create a touch screen.

For example, a capacitive sensing touch screen may include substantially transparent sensing points or nodes dispersed about cover glass. The cover glass 104 may serve as an outer protective barrier for the display region. Typically, the cover glass 104 may be adjacent to the display region. However, the cover glass 104 may also be integrated with the display region, such as another layer (outer protective layer) for the display region.

The cover glass 104 may extend across the entire top surface of the housing 102. In such a case, the edges of the cover glass 104 may be aligned, or substantially aligned, with the sides of the housing 102.

Given that the thickness of the cover glass 104 may be rather thin (i.e., typically less than a few millimeters), the cover glass 104 if not carefully arranged can be susceptible to cracking or breaking if a significant force is imposed thereon, such as by a drop event where the electronic device 100 is accidentally dropped.

The glass material for the cover glass 104 can be selected from available glass that is stronger. For example, alumino silicate glass (e.g., DVTS from Corning) is one suitable choice for the glass material for the cover glass 104. Other examples of glass materials include, but are not limited to including, sodalime, borosilicate, and the like.

Transparent camera window 106 can be integrated into the cover glass 104. Transparent camera window 106 can likewise comprise glass. However, in some embodiments, transparent camera window can comprise plastic.

The edges of the cover glass pieces can be configured to correspond to a particular predetermined geometry. By machining the edges of the cover glass 104 to correspond to the particular predetermined geometry, the cover glass 104 can become stronger and thus less susceptible to damage.

Moreover, as will be discussed in greater detail subsequently herein, the cover glass 104 can be selectively chemically treated for further strengthening. One suitable chemical treatment is to selectively expose one or more surface portions of the cover glass in a chemical bath containing potassium (e.g., KNO3) for a period of time (e.g., several hours) at an elevated temperature. The selective chemical treatment can desirably result in higher compression stresses at the selectively exposed surface portions of the cover glass. The higher compression stresses may be the result ion exchange wherein K+ ions effectively replacing some Na+ ions at or near the selectively exposed surface portions of the cover glass 104.

In addition to such selective strengthening, reducing veiling glare may improve quality of images or video captured by the camera through transparent camera window 106. Optical features such as an optical barrier region 110 may be disposed in the cover glass 104. The optical barrier region 110 may substantially reduce veiling glare, substantially inhibiting such diffuse stray light from reaching the image plane of the camera. Veiling glare might otherwise reduce contrast and resolution of images or video captured by the camera.

As shown in the figures (and as particularly shown in detailed view in FIG. 1B), the cover glass 104 can have a substantially smooth exterior surface comprising the transparent camera window 106 substantially encircled by the optical barrier perimeter 110. The exterior surface of the cover glass 104 can be lapped to be planar over the transparent camera window 106, the optical barrier perimeter 110 and the adjacent region 111 of the cover glass 104. As discussed in greater detail subsequently herein the optical barrier perimeter 110 may comprise metal.

The camera can be arranged adjacent to the transparent camera window 106 and within the optical barrier perimeter 110. The optical barrier perimeter 110 can be interposed within the cover glass 104 between the camera and an adjacent region 111 of the cover glass for reducing glare at the camera via the cover glass. More particularly, the optical barrier perimeter 110 can be interposed within the cover glass 104 between the transparent camera window 106 and an adjacent region 111 of the cover glass for reducing glare at the camera via the cover glass. As shown in the figures, the adjacent region 111 of the cover glass may comprise a majority region of the cover glass.

Similarly, the optical barrier perimeter 110 may be disposed within the cover glass 104 between the camera associated with transparent camera window 106 and the illuminator of the illuminator area. The optical barrier perimeter 110 may serve to substantially reduce light from the illuminator from coupling into the camera by way of the cover glass 104. More specifically, the optical barrier perimeter 110 may serve to substantially reduce veiling glare from the illuminator from coupling into the camera by way of the cover glass 104.

As shown in simplified cross sectional view in FIG. 1C, the electronic device 100 may include housing 102 (shown greatly simplified in FIG. 1C). Electrical components 103 may be disposed within housing 102. As mentioned previously herein the electrical components may include, but are not limited to, a controller (or processor), memory, battery, display, camera, and illuminator such as a flash. The cover glass 104 may be coupled to the housing 102, for example, using adhesive 105. For ease of illustration, in cross sectional views relative thickness of cover glass 104 is shown as greatly exaggerated. Similarly, for ease of illustration, layer thickness of optical barrier perimeter 110 is show as greatly exaggerated. The optical barrier perimeter 110 is highlighted in the figures using hatching.

As shown in cross sectional view in FIG. 1C, the cover glass 104 can have a substantially smooth exterior surface comprising the transparent camera window 106 substantially encircled by optical barrier perimeter 110. The optical barrier perimeter 110 can be interposed within the cover glass 104 between the transparent camera window 106 and adjacent region 111 of the cover glass, for reducing glare at the camera via the cover glass. The adjacent region 111 of the cover glass may comprise the majority region of the cover glass 104.

In FIG. 1D, a portion of the electronic device 100 is shown further simplified in cross sectional view, so as to illustrate operation of optical barrier perimeter 110 in reducing veiling glare at camera 107 of the electronics of device 100. Veiling glare propagating in cover glass 104 is depicted in FIG. 1D by notional dashed line arrows. The optical barrier perimeter 110 may substantially reduce veiling glare, substantially inhibiting such diffuse stray light from reaching the image plane of the camera 107. Accordingly, the optically barrier perimeter 110 is shown in FIG. 1D as blocking the notional dashed line arrows, so as to depict such substantial reduction in veiling glare.

As shown in FIG. 1D the camera 107 can be arranged adjacent to the transparent camera window 106 and within the optical barrier perimeter 110. The optical barrier perimeter 110 can be interposed within the cover glass 104 between camera 107 and adjacent region 111 of the cover glass for reducing glare at the camera 107 via the cover glass 104. More particularly, the optical barrier perimeter 110 can be interposed within the cover glass 104 between the transparent camera window 106 and an adjacent region 111 of the cover glass for reducing glare at the camera 107 via the cover glass 104. As shown in FIG. 1D, the adjacent region 111 of the cover glass 104 may comprise the majority region of the cover glass 104.

In FIG. 1E, a portion of the electronic device 100 is shown simplified in cross sectional view, so as to illustrate operation of optical barrier perimeter 110 in reducing veiling glare at camera 107 from illuminator 109 of the electronics of device 100. Veiling glare propagating in cover glass 104 from illuminator 109 is depicted in FIG. 1E by notional dashed line arrows. The optical barrier perimeter 110 may substantially reduce veiling glare from illuminator 109, substantially inhibiting such diffuse stray light of the illuminator from reaching the image plane of the camera 107. Accordingly, the optical barrier perimeter 110 is shown in FIG. 1E as blocking the notional dashed line arrows, so as to depict such substantial reduction in veiling glare from illuminator 109.

As shown in FIG. 1E the camera 107 can be being arranged adjacent to the transparent camera window 106 and within the optical barrier perimeter 110. The optical barrier perimeter 110 can be interposed within the cover glass 104 between camera 107 and adjacent region 111 (or illuminator area of illuminator 109) for reducing glare at the camera 107 via the cover glass. More particularly, the optical barrier perimeter 110 can be interposed within the cover glass 104 between the transparent camera window 106 and an adjacent region 111 (or illuminator area of illuminator 109) for reducing glare at the camera via the cover glass 104.

FIGS. 2A-5B show cover glass processing according to one embodiment.

Figure 2A:
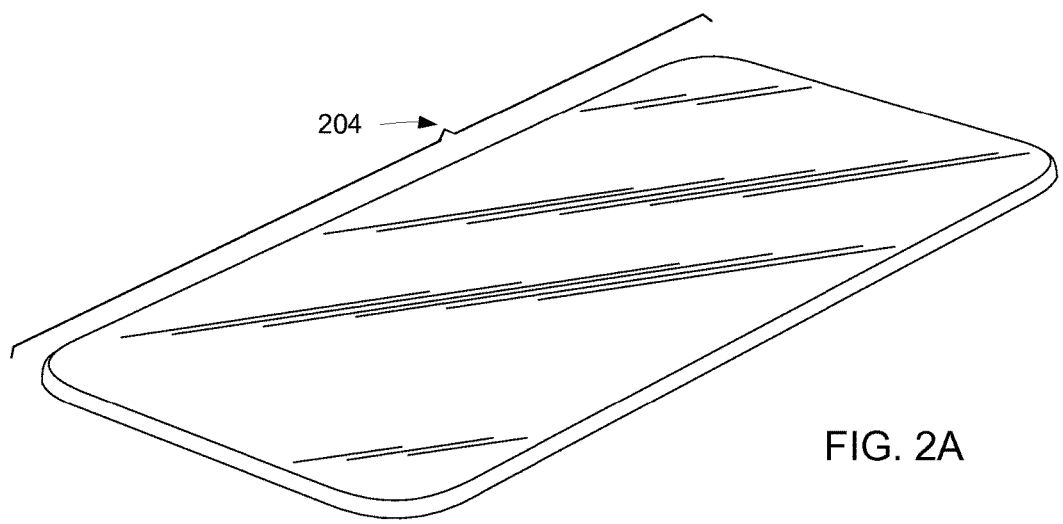
FIGS. 2A, 2B, 3A, 3B, 4A, 4B, 5A and 5B show cover glass processing according to one embodiment.
Figure 2B:
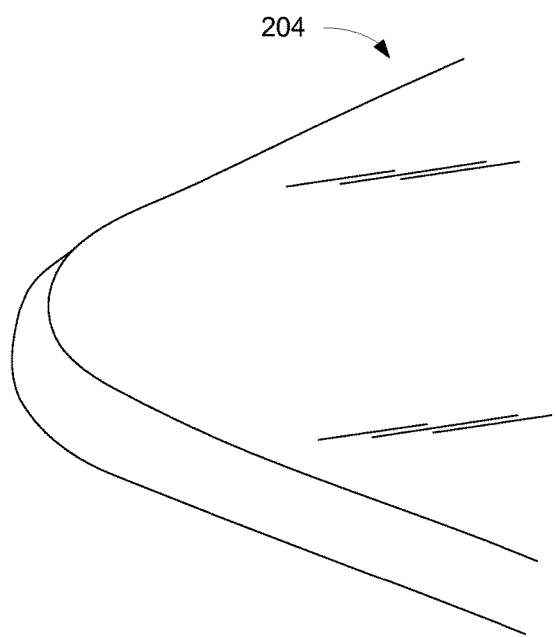

FIG. 2A shows a perspective view of cover glass 204, which may be singulated from sheet glass. FIG. 2B shows a detailed view of the peripheral region of cover glass 204.

Figure 3A:
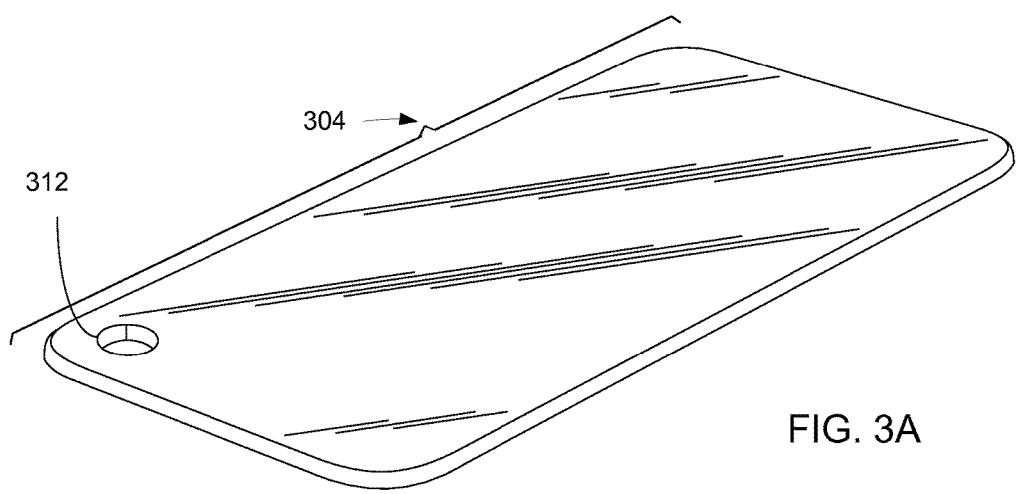
Figure 3B:
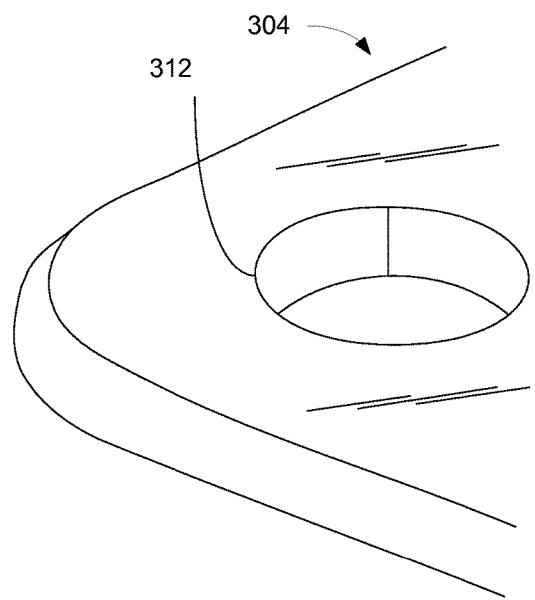

FIG. 3A shows a perspective view of processed cover glass 304 after an aperture 312 has been formed in the cover glass 304. The aperture 312 may be formed in various ways, for example by drilling. FIG. 3B shows a detailed view of the peripheral region of processed cover glass 304 with the aperture 312.

Figure 4A:
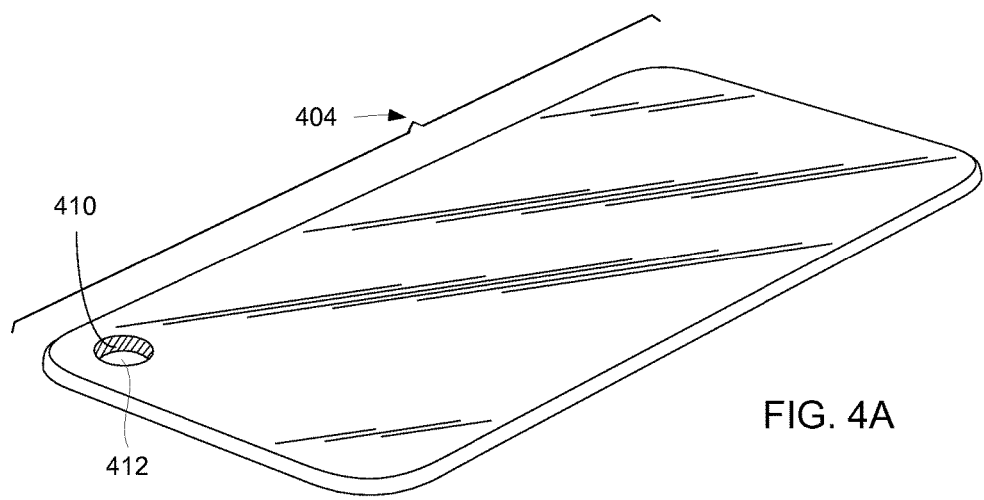

FIG. 4A shows a perspective view of a further processed cover glass 404 after an optical barrier perimeter 410 has been disposed in an aperture 412 formed in the cover glass 404. Optical barrier perimeter 410 can be metal, which may be selected to have a relatively high melting temperature, for example tungsten or molybdenum.

Layer thickness of the optical barrier perimeter 410 may be relatively thin, for example on the order of approximately hundreds of nanometers, or on the order of approximately a micron or microns. Layer thickness of the optical barrier perimeter 410 may be selected depending on the material (e.g. metal) and based on effectiveness for reducing veiling glare.

Various ways may be used for disposing the optical barrier perimeter 410 in the aperture 412 formed in the cover glass 404. For example, a process of Physical Vapor Deposition may be used. PVD allows for forming a thin layer of material (e.g., metal) in the aperture 412 which can serve as the optical barrier perimeter 410. As shown in FIG. 4A, the thin layer of material applied by a PVD process can be provided on the exposed sides within the aperture 412 of the cover glass.

Figure 4B:
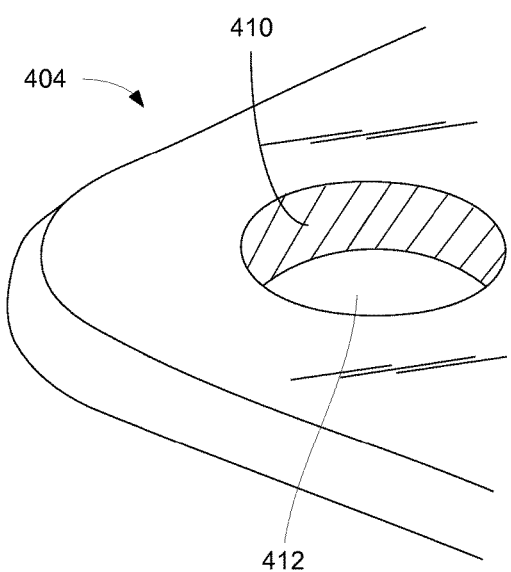

FIG. 4B shows a detailed view of the peripheral region of further the processed cover glass 404. Optical barrier perimeter 410 is highlighted in FIGS. 4A and 4B using hatching.

Figure 5A:
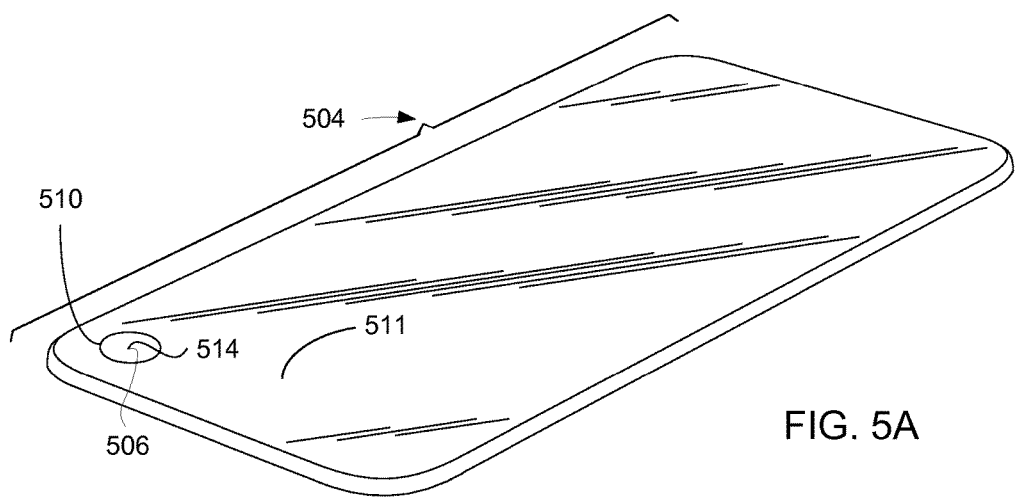

FIG. 5A shows a perspective view of a further processed cover glass 504 after a transparent camera window 514 has been disposed within optical barrier perimeter 510, and within an aperture 506 extending through the cover glass 504. The transparent camera window 514 can be formed as a suitably sized glass plug or peg, and can be hot pressed in place at a suitable temperature, for example approximately six hundred (600) to approximately seven hundred (700) degrees Celsius (° C.).

Figure 5B:
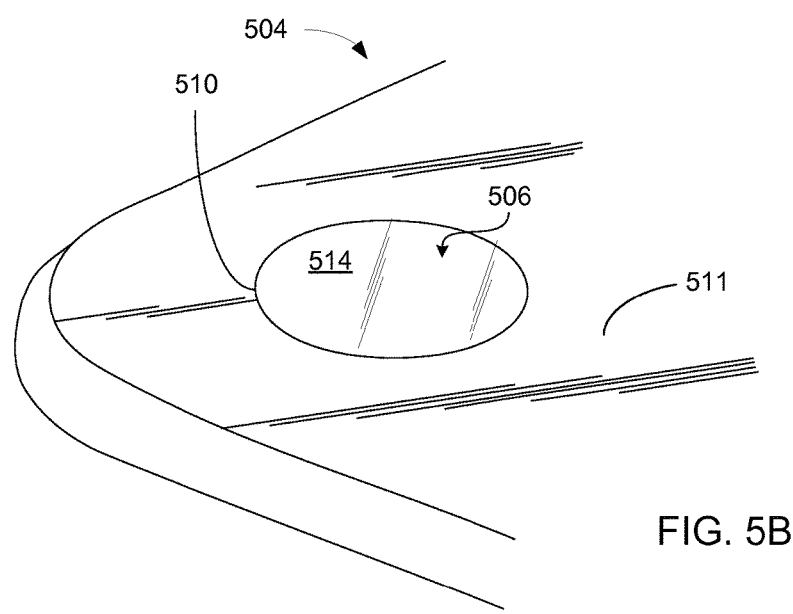

As particularly shown in detailed view in FIG. 5B, the cover glass 504 can have a substantially smooth exterior surface comprising the transparent camera window 514 substantially encircled by the optical barrier perimeter 510. The exterior surface (e.g., front or rear surface) of the cover glass 504 can be lapped to be planar over the transparent camera window 514, the optical barrier perimeter 510 and the adjacent region 511 of the cover glass 504.

Figure 6A:
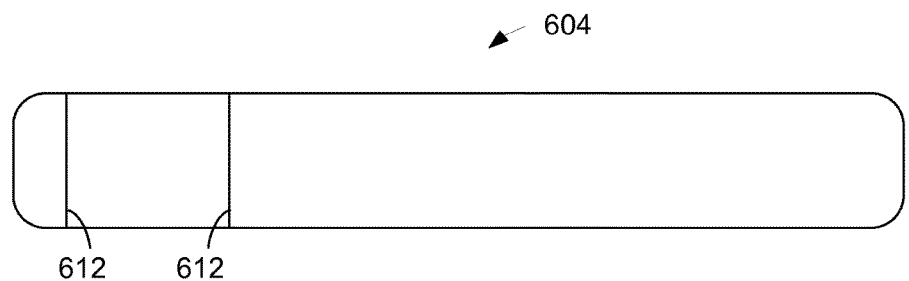
FIGS. 6A-6D are simplified cross sectional views illustrating cover glass processing according to one embodiment.

FIGS. 6A-6D are simplified cross sectional views illustrating cover glass processing according to one embodiment. FIG. 6A shows a cross sectional view of processed cover glass 604 after an aperture 612 has been formed in the cover glass 604. As mentioned previously, the aperture 612 may be formed in various ways, for example by drilling.

Figure 6B:
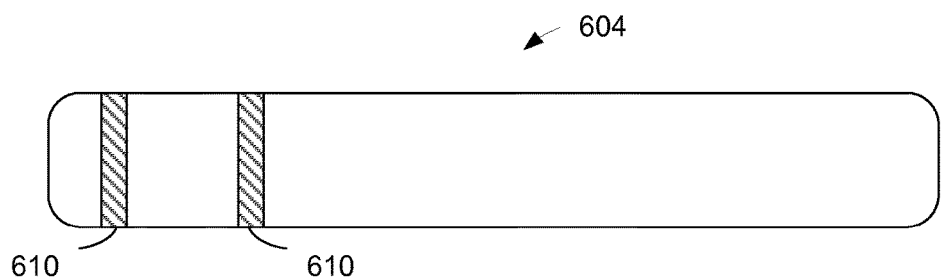

FIG. 6B shows a cross sectional view of the further processed cover glass 604 after an optical barrier perimeter 610 has been disposed in the aperture 612 formed in the cover glass 604. As mentioned previously, the optical barrier perimeter 410 can be metal. The metal may be selected to have a relatively high melting temperature, for example tungsten or molybdenum. The optical barrier perimeter 610 is highlighted in the figures using hatching.

Figure 6C:
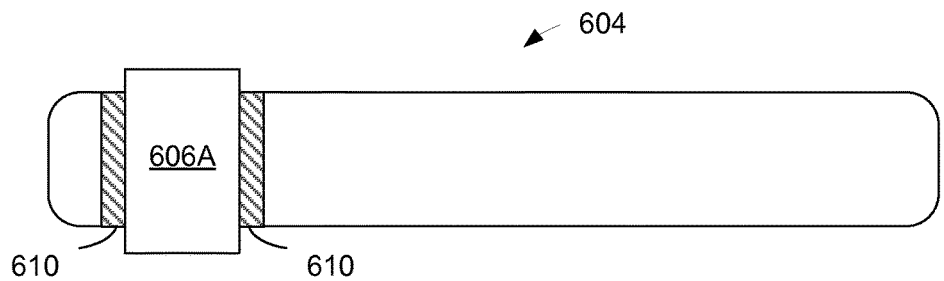

FIG. 6C shows a cross sectional view of the further processed cover glass 604 after an elongated transparent camera window 606A has been disposed within optical barrier perimeter 610 and within the aperture extending through cover glass 604. The elongated transparent camera window 606A can be formed as an elongated glass plug or peg, and can be hot pressed in place at a suitable temperature, for example approximately six hundred (600) to approximately seven hundred (700) degrees Celsius (° C.). As will be discussed next, the elongated transparent camera window 606A can be lapped down, using a suitable abrasive slurry (e.g., comprising cesium oxide), so that the exterior surface of the cover glass can be planar.

Figure 6D:
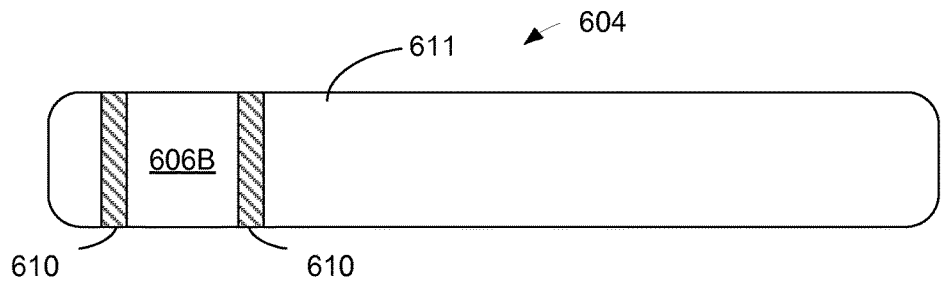

For example, as shown in cross sectional view in FIG. 6D, the cover glass 604 can have a substantially smooth exterior surface comprising the transparent camera window 606B substantially encircled by the optical barrier perimeter 610. The resulting exterior surface of the cover glass 604 can be planar over the transparent camera window 606B, the optical barrier perimeter 610 and the adjacent region 611 of the cover glass 604.

Figure 7A:
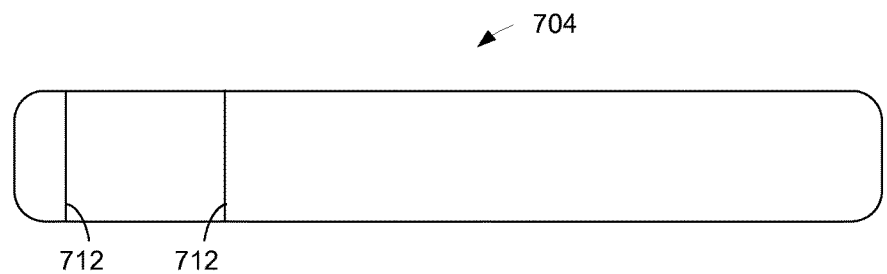
FIGS. 7A-7C are simplified cross sectional views illustrating cover glass processing according to another embodiment.
Figure 7B:
Figure 7C:
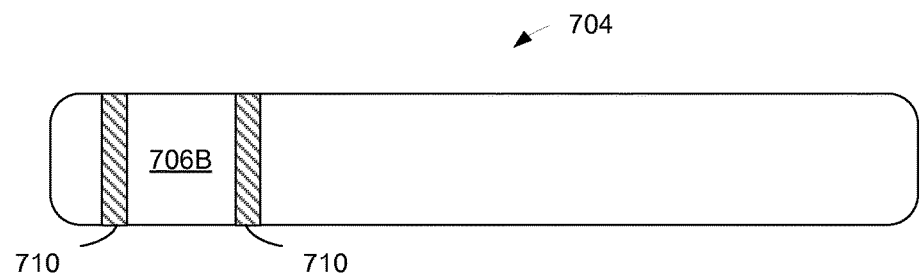

FIGS. 7A-7C are simplified cross sectional views illustrating cover glass processing according to another embodiment. FIG. 7A shows a cross sectional view of a processed cover glass 704 after an aperture 712 has been formed in the cover glass 604. As mentioned previously, the aperture 712 may be formed in various ways, for example by drilling.

Rather than disposing an optical barrier perimeter in the aperture 712 formed in the cover glass 604 as just discussed with respect to FIG. 6B, in this alternative embodiment of FIG. 7B an optical barrier perimeter 710 is disposed as a coating onto an elongated transparent camera window 706A. FIG. 7B shows a cross sectional view of the further processed cover glass 704 after the elongated transparent camera window 706A (coated with the optical barrier perimeter 710) has been disposed within the aperture 712 extending through the cover glass 704. The elongated transparent camera window 706A can be formed as an elongated glass plug or peg, and can be hot pressed in place at a suitable temperature, for example approximately six hundred (600) to approximately seven hundred (700) degrees Celsius (® C.). As will be discussed next, the elongated transparent camera window 706A (coated with the optical barrier perimeter 710) can be lapped down, using a suitable abrasive slurry (e.g., comprising cesium oxide), so that the exterior surface of the cover glass 704 can be planar.

For example, as shown in cross sectional view in FIG. 7C, the cover glass 704 can have a substantially smooth exterior surface comprising the transparent camera window 706B substantially encircled by the optical barrier perimeter 710. The resulting exterior surface of the cover glass 704 can be planar over the transparent camera window 706B, the optical barrier perimeter 710 and adjacent region 711 of the cover glass 704.

Figure 8A:
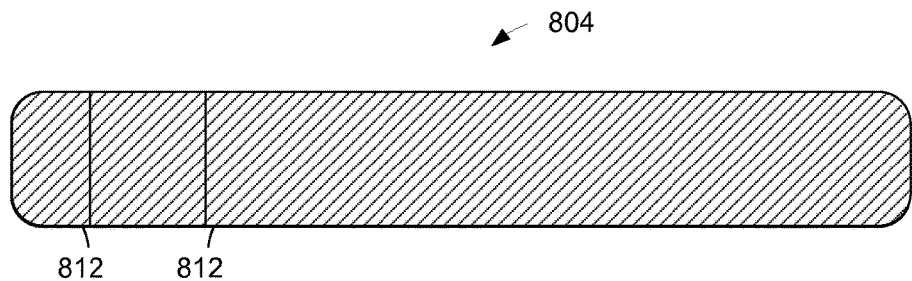
FIGS. 8A-8C are simplified cross sectional views illustrating cover glass processing according to another embodiment.
Figure 8B:
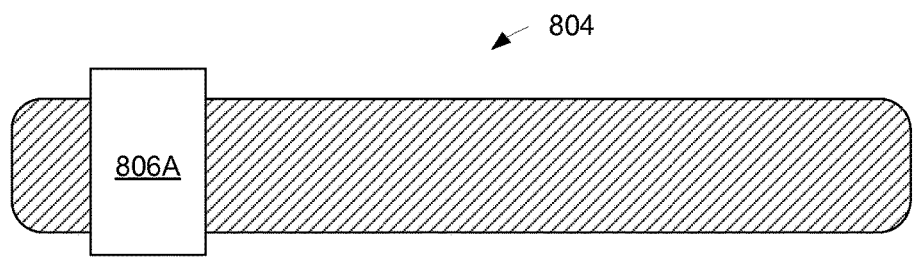
Figure 8C:
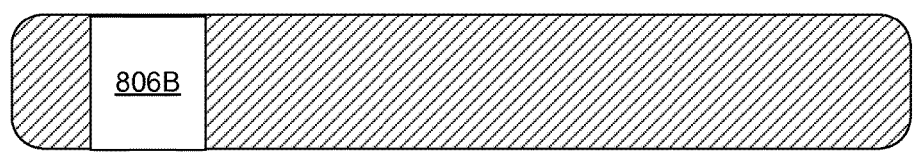

FIGS. 8A-8C are simplified cross sectional views illustrating cover glass processing according to another embodiment. FIG. 8A shows a cross sectional view of a processed cover glass 804 after an aperture 812 has been formed in the cover glass 804. In the embodiment shown in FIG. 8A, the glass of the cover glass 805 can be dark or opaque, as representatively illustrated by right to left hatching.

FIG. 8B shows a cross sectional view of the dark or opaque cover glass 804 after an elongated transparent camera window 806A has been disposed within the aperture 812 extending through the dark or opaque cover glass 804. The elongated transparent camera window 806A can be formed as an elongated glass plug or peg, and can be hot pressed in place at a suitable temperature, for example approximately six hundred (600) to approximately seven hundred (700) degrees Celsius (° C.). As will be discussed next, the elongated transparent camera window 806A can be lapped down, using a suitable abrasive slurry (e.g., comprising cesium oxide), so that the exterior surface of the dark opaque cover glass can be planar.

For example, as shown in cross sectional view in FIG. 8C, the dark or opaque cover glass 804 can have a substantially smooth exterior surface comprising the transparent camera window 806B. The resulting exterior surface of the dark or opaque cover glass 804 can be planar over the transparent camera window 806B and adjacent region 811 of the dark or opaque cover glass 804.

Figure 8D:
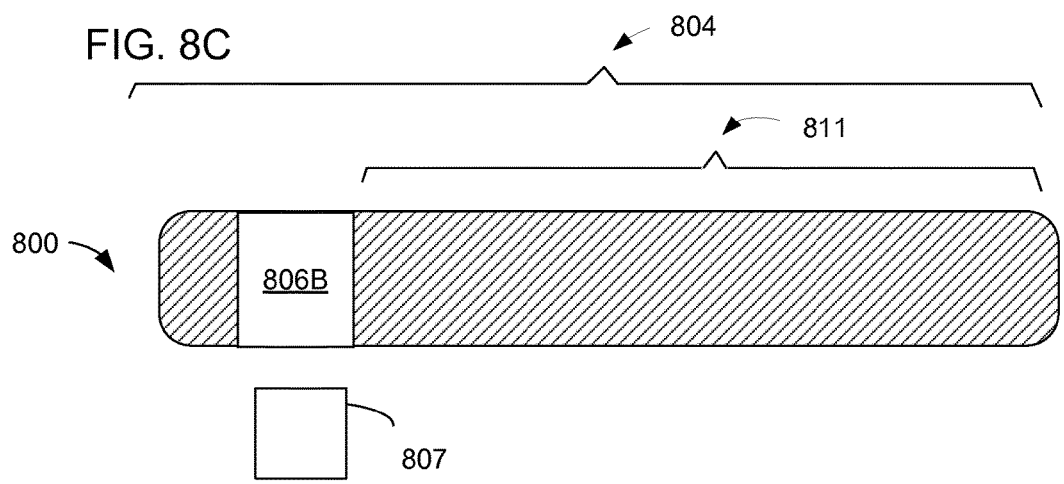
FIG. 8D is a simplified view of another embodiment of a consumer electronic product.

FIG. 8D is a simplified view of another embodiment of a consumer electronic product 800. The consumer electronic product 800 can comprise a housing and electrical components disposed at least partially internal to the housing. The electrical components can including at least a camera 807.

The consumer electronic product 800 can include the cover glass 804 coupled to the housing. The cover glass 804 can include the transparent camera window 806B and an adjacent glass region 811 that is dark or opaque. The camera 807 can be arranged adjacent to the transparent camera window 806B. The adjacent glass region 811 can be sufficiently dark or opaque for substantially reducing glare at the camera 807 via the cover glass 804.

The cover glass 804 can have a substantially smooth exterior surface extending over the transparent camera window 806B and the adjacent glass region 811. The cover glass 804 can have an exterior surface that is lapped to be planar over the transparent camera window 806B and the adjacent glass region 811.

Figure 9:
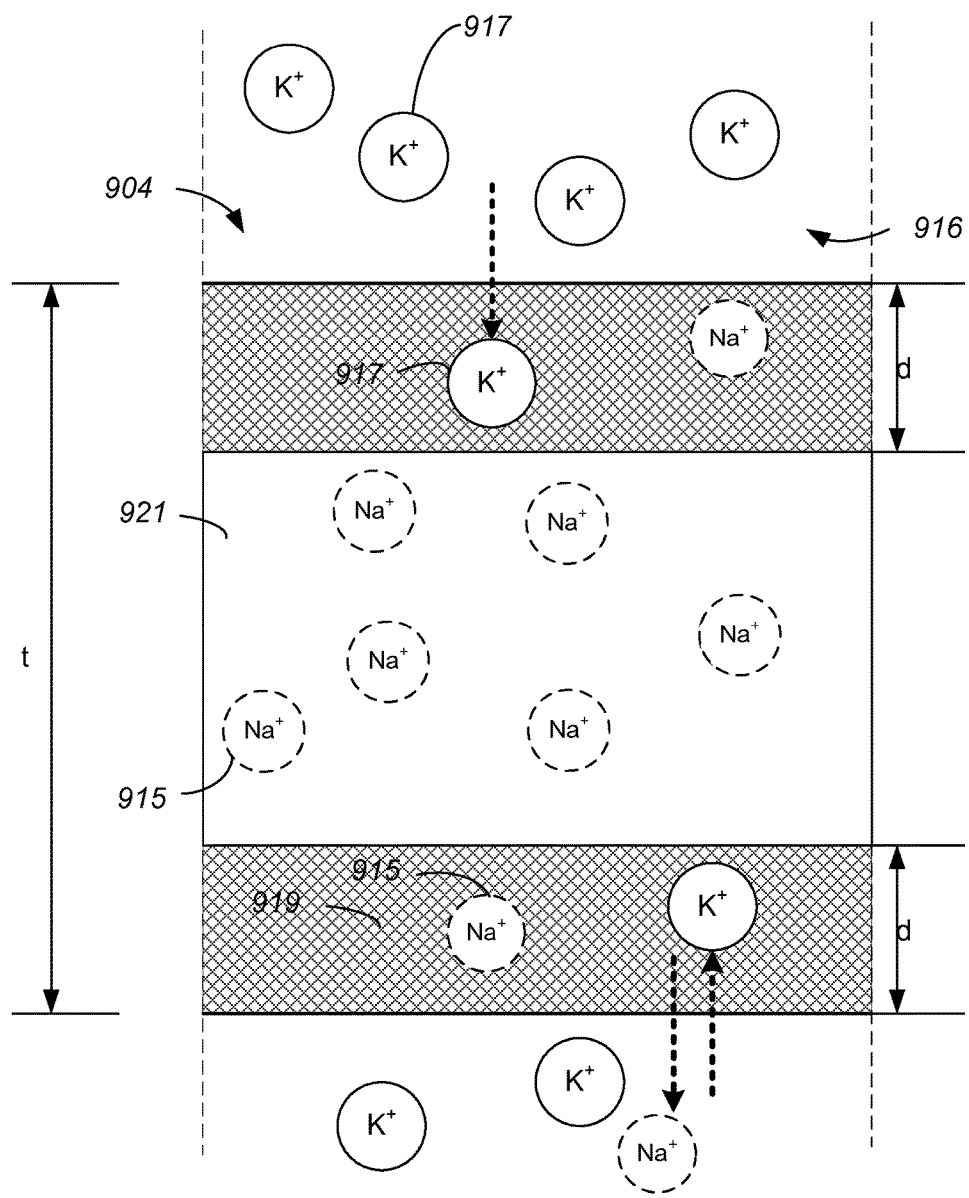
FIG. 9 is a diagram showing a detailed partial cross sectional view of chemical strengthening of exposed surface portions of cover glass.

FIG. 9 is a diagram showing a detailed partial cross sectional view of chemical strengthening of exposed surface portions of cover glass. FIG. 9 diagrammatically illustrates a chemical treatment process of submerging the cover glass 904 in a heated potassium bath 916 (for example a molten KNO3 bath), for chemically strengthening the cover glass 904. When the cover glass 904 is submerged or soaked in the heated potassium bath 916, diffusion and ion exchange can occur at exposed surface portions of the cover glass 904.

As shown in FIG. 9, $Na^+$ ions 915 which are present in cover glass 904 can diffuse into potassium bath 916, while $K^+$ ions 917 in potassium bath 916 can diffuse into cover glass 904 such that a compressive surface layer 919 can be formed. In other words, $K^+$ ions 917 from potassium bath 916 can be exchanged with $Na^+$ ions 915 to form compressive surface layer 919. The $K^+$ ions 917 can provide a compressive stress surface stress (CS) of the compressive surface layer 919, which chemically strengthens the compressive surface layer 919 of the cover glass 904. Compressive surface layer 919 is highlighted using cross hatching.

Cover glass 904 is shown in FIG. 9 as having a thickness (t). By controlling chemical treatment parameters such as the length of time of chemical strengthening treatment and/or the concentration of K⁺ ions 917 in potassium bath 916, a depth (d) of compressive surface layer 919 and compressive stress surface stress (CS) of the compressive surface layer 919 may be substantially controlled. In some cases, K⁺ ions 917 may not diffuse into a center portion 921 of the cover glass 904. In FIG. 9, the center portion 921 is shown without cross hatching. The central portion 921 of the cover glass 904 can have a central tension (CT) in response to the compressive stress surface stress (CS) of the compressive surface layer 919.

Figure 10A:
FIGS. 10A and 10B are simplified cross sectional views illustrating chemical strengthening of cover glass according to one embodiment.
Figure 10B:
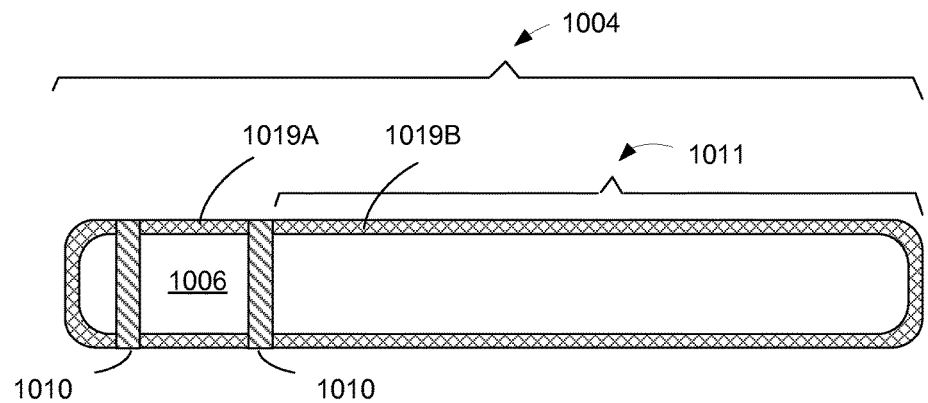

FIGS. 10A and 10B are simplified cross sectional views illustrating chemical strengthening of a cover glass 1004 according to one embodiment. FIG. 10A shows the cover glass 1004 prior to any chemical strengthening. FIG. 10B shows the cover glass 1004 after chemical strengthening.

As shown in FIGS. 10A and 10B, the cover glass 1004 can have a substantially smooth exterior surface comprising transparent camera window 1006 substantially encircled by an optical barrier perimeter 1010. The exterior surface of the cover glass 1004 can be lapped, for example prior to chemical strengthening, to be planar over the transparent camera window 1006, the optical barrier perimeter 1010 and an adjacent region of the cover glass 1004.

After chemical strengthening, FIG. 10B shows a chemically strengthened surface 1019A of the glass camera window 1006. FIG. 10B also shows a chemically strengthened surface 1019B of the adjacent region 1011 of the cover glass 1004.

Figure 10C:
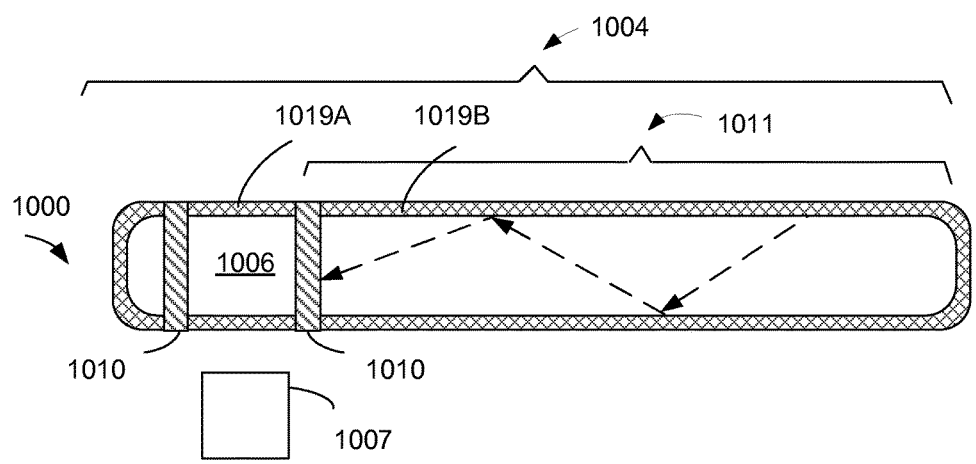
FIG. 10C is a simplified view of another embodiment of a consumer electronic product.

FIG. 10C is a simplified view of another embodiment of a consumer electronic product 1000 comprising a housing and electrical components disposed at least partially internal to the housing, wherein the electrical components include at least a camera 1007. The cover glass 1004 can be coupled to the housing.

The cover glass 1004 can comprise the glass camera window 1006 having the chemically strengthened surface 1019A. The cover glass 1004 can comprise the adjacent region 1011 having chemically strengthened surface 1019B. The cover glass 1004 can further comprise the optical barrier perimeter 1010. The optical barrier perimeter 1010 can substantially encircle the glass camera window 1006. The optical barrier perimeter 1010 can comprise metal.

The camera 1007 can be arranged adjacent to the glass camera window 1006. The optical barrier perimeter 1010 can be interposed within the cover glass 1004 between the camera 1007 and the adjacent region 1011 of the cover glass for reducing glare at the camera 1007 via the cover glass. More particularly, the optical barrier perimeter 1010 can be interposed within the cover glass 1004 between the glass camera window 1006 and the adjacent region 1011 of the cover glass 1004 and can serve to reduce glare at the camera 1007 via the cover glass 1004.

In FIG. 10C, the electronic device 1000 is shown simplified in cross sectional view, so as to illustrate operation of the optical barrier perimeter 1010 in reducing veiling glare at the camera 1007 of the electronics of device 1000. Veiling glare propagating in the cover glass 1004 is depicted in FIG. 10C by notional dashed line arrows. The optical barrier perimeter 1010 may substantially reduce veiling glare, substantially inhibiting such diffuse stray light from reaching the image plane of the camera 1007. Accordingly, the optically barrier perimeter 1010 is shown in FIG. 10C as blocking the notional dashed line arrows, so as to depict such substantial reduction in veiling glare.

For the consumer electronic product 1000 shown in FIG. 10C, the cover glass 1004 can have a substantially smooth exterior surface extending over the glass camera window 1006, the optical barrier perimeter 1010 and the adjacent region 1011 of the cover glass 1004. The cover glass 1004 can have an exterior surface that is planar (e.g., by lapping) over the glass camera window 1006, the optical barrier 1010 and the adjacent region 1011 of the cover glass 1004.

Figure 11:
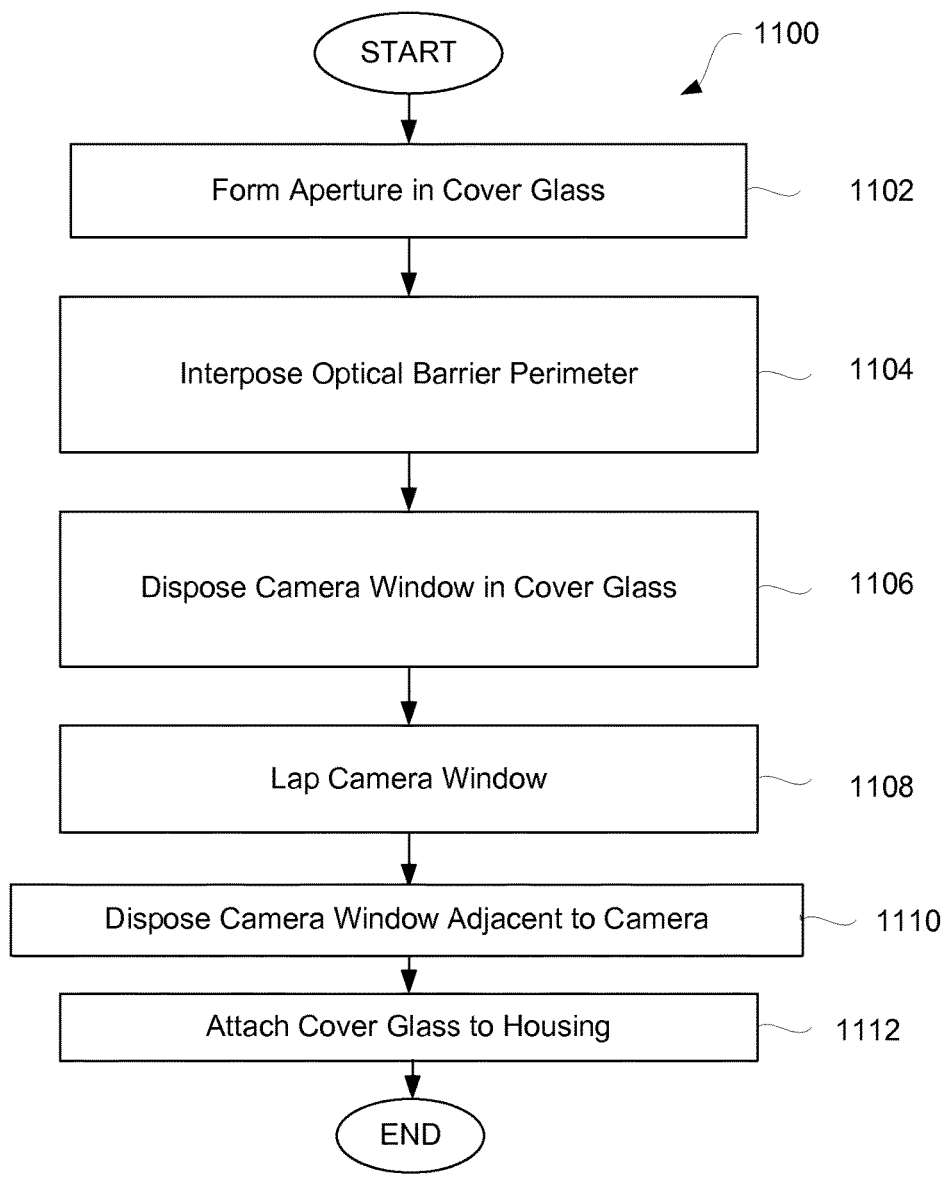
FIG. 11 is a flow diagram showing an assembly process according to one embodiment.

FIG. 11 is a flow diagram illustrating an assembly process 1100 according to one embodiment. The assembly process 1100 may begin by forming 1102 an aperture in a cover glass. The process 1100 may continue by interposing 1104 an optical barrier perimeter which substantially encircles a camera window. The optical barrier perimeter provided between the camera window and an adjacent glass region.

The process 1100 may continue by disposing 1106 the transparent camera window in the aperture of the cover glass. For a tight fit, the transparent camera window can be heated (i.e., becomes compliant) and pressed into place within the aperture. The process 1100 may continue with lapping 1108 the transparent camera window such that the transparent camera window and an adjacent glass region of the cover glass yield a planar exterior surface of the cover glass.

The process 1100 may continue with disposing 1110 the transparent camera window adjacent to a camera. The process 1100 may continue with subsequently attaching 1112 the cover glass to a housing for the electronic product. Once the cover glass has been attached to the housing, the assembly process 1100 can end.

This application references U.S. patent application Ser. No. 12/847,926 filed Jul. 30, 2010, and entitled "Electronic Device Having Selectively Strengthening Glass Cover Glass", which is hereby incorporated herein by reference.

Embodiments of the invention are well suited for portable, battery-powered electronic devices, and more particularly handheld battery-powered electronic devices. Examples of portable, battery-powered electronic devices can include laptops, tablet computers, media players, phones, GPS units, remote controls, personal digital assistant (PDAs), and the like.

The various aspects, features, embodiments or implementations of the invention described above can be used alone or in various combinations.

The advantages of the invention are numerous. Different aspects, embodiments or implementations may (but need not) yield one or more of the following advantages. One advantage of the invention is that cover glass can be strengthened, even at a camera window region, to protect from damage that would otherwise result from a drop event. Another advantage is efficiency and/or pleasing appearance in integrating a transparent camera window into the cover glass. Another advantage is improved image or video quality, which may result from substantially reducing veiling glare.

The many features and advantages of the invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A consumer electronic product, comprising:
   a housing;
   electrical components disposed at least partially internal to the housing, said electrical components including at least a camera; and a cover glass coupled to the housing, the cover glass comprising a transparent camera window and an adjacent glass region that is integrally dark or opaque, the transparent camera window extending through the cover glass and having sides, the camera being arranged at least partially internal to the housing and adjacent to the transparent camera window, sides of the adjacent glass region being adjacent the sides of the transparent camera window with no intervening structural material, and the adjacent glass region being sufficiently dark or opaque for substantially reducing glare at the camera via the cover glass.

2. The consumer electronic product as recited in claim 1 wherein the cover glass has a substantially smooth exterior surface extending over the transparent camera window and the adjacent glass region.

3. The consumer electronic product as recited in claim 1 wherein the cover glass has an exterior surface that is lapped to be planar over the transparent camera window and the adjacent glass region.

4. A consumer electronic product as recited in claim 1 wherein the transparent camera window comprises glass.

5. A consumer electronic product as recited in claim 1 wherein the transparent camera window comprises plastic.

6. The consumer electronic product as in claim 1 wherein the adjacent region of the cover glass comprises a majority region of the cover glass, and wherein the transparent camera window comprises a minority region of cover glass arranged adjacent to the camera.

7. The consumer electronic product as recited in claim 1 wherein the transparent camera window comprises a peripheral region of cover glass adjacent to the camera.

8. The consumer electronic product as recited in claim 1 wherein the cover glass substantially overlaps the camera.

9. The consumer electronic product as recited in claim 1 wherein the electrical components further comprise an illuminator; and wherein the cover glass is substantially transparent to the illuminator and arranged so that illumination projects outwardly from the cover glass.

10. The consumer electronic product as recited in claim 9 wherein the cover glass substantially overlaps the camera.

11. The consumer electronic product as in claim 10 wherein the adjacent region of the cover glass comprises a majority region of the cover glass, and wherein the transparent camera window comprises a minority region of cover glass arranged adjacent to the camera.

12. The consumer electronic product as recited in claim 11 wherein the transparent camera window comprises a peripheral region of cover glass adjacent to the camera.

13. The consumer electronic product as recited in claim 11, wherein the adjacent glass region being in direct contact with one or more of the sides of the transparent camera window.

14. The consumer electronic product as recited in claim 1, wherein the adjacent glass region being in direct contact with one or more of the sides of the transparent camera window.

15. A method for assembling an electronic product, the electronic product having a housing and including a camera within the housing, the housing including a glass cover, the method comprising:
   disposing a transparent camera window in an aperture in the cover glass;
   lapping the transparent camera window and an adjacent glass region of the cover glass into a planar exterior surface of the cover glass, the transparent camera window extending through a thickness of the cover glass and having sides, sides of the adjacent glass region being adjacent the sides of the transparent camera window with no intervening structural material, and the adjacent glass region being sufficiently dark or opaque through its depth for substantially reducing glare at the camera via the cover glass; and
   subsequently attaching the cover glass to a housing for the electronic product, wherein the transparent camera window is provided adjacent to the camera.

16. The method as recited in claim 15 wherein the adjacent glass region of the cover glass comprises a majority region of the cover glass, and wherein the transparent camera window comprises a minority region of cover glass arranged adjacent to the camera.

17. The method as recited in claim 15 wherein the cover glass has a substantially smooth exterior surface extending over the transparent camera window and the adjacent glass region.

18. The method as recited in claim 15 wherein the transparent camera window comprises glass.

19. The method as recited in claim 15 wherein the cover glass substantially overlaps the camera.

20. The method as recited in claim 15,
   wherein the adjacent glass region of the cover glass comprises a majority region of the cover glass, and wherein the transparent camera window comprises a minority region of cover glass arranged adjacent to the camera,
   wherein the cover glass has a substantially smooth exterior surface extending over the transparent camera window and the adjacent glass region, and
   wherein the transparent camera window comprises glass.

21. The method as recited in claim 20, wherein the adjacent glass region being in direct contact with one or more of the sides of the transparent camera window.

22. The method as recited in claim 15, wherein the adjacent glass region being in direct contact with one or more of the sides of the transparent camera window.

* * * * *